INVENTOR
Robert F. Barrell
BY
Hyman Diamond
ATTORNEY

Jan. 23, 1962 R. F. BARRELL 3,018,050

ECONOMIC DATA COMPUTER

Filed April 29, 1958 6 Sheets-Sheet 2

Jan. 23, 1962 R. F. BARRELL 3,018,050

ECONOMIC DATA COMPUTER

Filed April 29, 1958 6 Sheets-Sheet 3

Jan. 23, 1962 R. F. BARRELL 3,018,050

ECONOMIC DATA COMPUTER

Filed April 29, 1958 6 Sheets-Sheet 4

Jan. 23, 1962 R. F. BARRELL 3,018,050

ECONOMIC DATA COMPUTER

Filed April 29, 1958 6 Sheets-Sheet 5

Jan. 23, 1962 R. F. BARRELL 3,018,050

ECONOMIC DATA COMPUTER

Filed April 29, 1958 6 Sheets-Sheet 6

United States Patent Office 3,018,050

Patented Jan. 23, 1962

3,018,050

ECONOMIC DATA COMPUTER

Robert F. Barrell, Lancaster, N.Y., assignor to Westinghouse Electric Corporation, East Pittsburgh, Pa., a corporation of Pennsylvania Filed Apr. 29, 1958, Ser. No. 731,708
4 Claims. (Cl. 235—193)

This invention relates to the computer art and has particular relation to computers of the type with which economic data may be readily calculated. While this invention arose out of the problems of computing economic data and this invention in its specific aspects concerns itself with these problems, the concepts on which this invention in its broader aspects is based have applicability to computers of other types. To the extent that this invention is applicable to the latter such applications are within the scope of this invention.

Economic data is characterized by the fact that it is governed by a large number of variable factors and the equations from which such data is derivable are of a quasi empirical character including parameters in various forms corresponding to all or at least the most important of these factors. In addition, economic data calculations such as the calculations of return-on-investments involve equations similar to those used in the calculation of interest data. Such equations are not readily solved in a simple manner nor are they readily transformable into simpler equations.

It is then broadly an object of this invention to provide a computer with which a relatively unskilled operator can derive economic data from the equations defining the desired data.

To facilitate the understanding of this invention it is believed desirable at the outset to explain the meaning of some of the unusual terms which will be used in this application and to review several equations of different types with which this invention concerns itself. An equation usually expresses a so-called dependent variable or dependent parameter as a function of one or more independent variables or independent parameters. It is contemplated that in applying such an equation the independent variables will be changed over certain ranges and thus determine the magnitude of the dependent variables. In general terms an equation of the type just mentioned may be written:

$$z=f(x,y)$$

In this equation, $z$ is the dependent variable and $x$ and $y$ are the independent variables. Sometimes the form of $f$ is such that the equation may be transformed so that either $x$ or $y$ may become a dependent variable and $z$ an independent variable. Such a transformed equation would be $$x=f_1(y,z)$$

An equation dealing with economic data may usually be expressed as the algebraic sum of a plurality of terms equated to zero. For example, the above equation may be written $$z-f(x,y)=0$$

The parts $z$ and $f(x,y)$ are called the terms of this equation.

Each term of an equation may have any general form. Specifically, a term may consist of a product of several variables for example, $f(x,y)$ would be the product $axy$. A term may also consist of the algebraic sum of a plurality of other terms multiplied by a third parameter or one of the terms. Thus a term in the above equation could be the product $a(x-y)$.

The equations defining the economic data with which this invention concerns itself include the functions of the different types and the equation forms of the different types just mentioned, and it is a specific object of this invention to provide a computer which shall include facilities for readily simulating the functions of the different types discussed above and for solving equations including such functions.

Among the equations with which this invention concerns itself is the classical equation for computing economical manufacturing lot size (see Product Engineering Mid October, 1957, page A–2 "Economic Lot Size for Manufacture," Edward C. Varnum). This equation is used in determining the most propitious quantity of items to be manufactured in replenishing stock. The quantity of items is referred to as lot size. The classical economic lot-size equation expresses the lot size L as $$L=\sqrt{\frac{24ms}{FC}} \quad (1)$$

In this equation $m$=the number of units used per month (this will usually be set month by month).
$s$=the cost of setting up the machine for making items.
$F$=carrying charge on the items in percent.
$C$=the unit cost per item in dollars.

In a modern organization such as one of the automotive companies or one of the large electrical companies, thousands of items are maintained in stock. Since the lack of even a single one of these many items can stop a production line at large economic cost or send a customer to a competitor, it is necessary that the utmost care be given to maintaining the stock. But it is also essential that the replenishment of the stock be carried out economically at a minimum cost. The most economic lot size for each item can be calculated on the basis of Equation 1 just discussed but where a large number of items are involved the labor of carrying out the calculations long hand, even with handbooks, and the possibility of costly errors constitute a serious inconvenience.

It is then an object of this invention to provide a computer of relatively simple structure with which clerical personnel could readily and accurately calculate economic lot size on the basis of the above described classical economic lot-size equation or a like equation.

In arriving at the aspect of this invention concerning economic lot-size Equation 1, it was realized that the calculations must be relatively precise and that the range in the magnitude of the various factors of this equation which would be encountered in practice would vary widely for each factor and would differ radically for the different factors. Thus, the factor $m$ could be as high as 100,000 or 1,000,000, and could be as low as one or two. The factor $s$ could be several dollars or several hundred dollars. The factor F could be 1% or as high as 30 or 50%, the factor C could vary from a few cents to one thousand dollars. This invention to the extent that it concerns the calculations based on Equation 1 arises from the realization that in determining L from Equation 1 the various factors should be set on a logarithmic rather than a linear scale. Thus Equation 1 can be written:

$$2\log L=\log 24+\log m+\log s-\log F-\log C \quad (2)$$

or $$2\log L-\log 24-\log m-\log s+\log F+\log C=0 \quad (3)$$

As last expressed, the classical economic lot-size Equation 3 consists of the sum of a plurality of terms (that is the log terms) equated to zero.

In accordance with this invention apparatus is provided for determining log L from which the lot size may be readily calculated. This apparatus includes a meter and a plurality of variable electrical components, each component corresponding to a parameter or variable of the above equation. The components are connected in series and a potential having a magnitude equal to the corresponding parameter is impressed across each component and a voltmeter is connected across the components to measure their net voltage. So that the settings of the variable resistors may be comparable, the units adopted for the potential across all the resistors must be the same. A convenient unit is the volt.

In the use of the apparatus, the magnitude for the various terms log 24, log *m*, log *s*, log F and log C are set on the corresponding components and the component corresponding to log L is varied until the meter reads zero. The setting of the latter component then determines the magnitude of 2 log L.

In accordance with one specific aspect of this invention, the components are a plurality of variable resistors each connected across the secondary winding of a transformer. The number of turns of each secondary winding is so related to the number of turns of its associated primary winding that the potential across each secondary winding corresponds to the range of variation of the corresponding parameter.

In accordance with another specific aspect of this invention, a variable transformer for example a Variac transformer is provided for each of the terms. Each variable transformer is preferably an autotransformer and its seconday supplies a transformer from the secondary of which potentials corresponding to the parameter represented by the variable transformer is derivable. The latter transformers are so related that each supplies a secondary potential, which expressed in volt unit, is capable of covering the range of variation of the corresponding parameter.

The classical economic lot-size equation is an equation in a few selected parameters. The practical conditions to which it is applied in many cases involve a far larger number of parameters, some of them highly complex, which are related to each other in complex ways.

Higher accuracy than that available from Equation 1, may be obtained by introducing some of the most important of these additional parameters. Specifically the product FC which, in effect, is the carrying cost of the items, can be broken down into its more important component costs. Where the apparatus in accordance with this invention is to have this additional accuracy the product FC is replaced by a factor K. This factor K has been found by Dr. Paul T. Norton, Jr. to be given by the following equation:

$$K=\frac{(B+I)C+ZA(1-R)}{2} \qquad (4)$$

in which:

$B$=Taxes, insurance and other like charges in percent per year on each item in the inventory.

$I$=Desired return on the capital invested on each item in stock in percent per year.

$C$=As before is the unit cost per item in dollars.

$Z$=A factor which is governed by the storage space for the item. Where the storage space is to be reserved, $Z=2$. Where any storage space avalibale may be used, $Z=1$.

$A$=The cost of floor space for one item for one year in dollars.

$$R=\frac{M}{P}$$

where $M$=the units used per month or per any unit of time which may be changed from month to month, and $P$=the number of items made per month or per the same unit of time with the apparatus set up. ($P$ must be changed as the facilities for production changes.) (See Economic Lot Sizes In Manufacturing, Paul T. Norton, Jr., Professor of Industrial Engineering, Virginia Polytechnic Institute, Extension Bulletin No. 31.)

The ratio R will be supplied to the personnel making the calculations periodically as it may change.

For convenience two new equations may now be written. One of these equations is $$Q_e=\sqrt{\frac{12MS}{K}} \qquad (5)$$

$Q_e$=economic lot size.

$S$=total preparation cost per lot. This includes the cost of preparing manufacturing orders, the cost of setting up the machine, and any other costs independent of the number of items in the lot.

$M$=times used per month.

$K$ is defined by Equation 4.

The equation for K includes the product $(B+I)C$, and $ZA(1-R)$, that is the product of a sum of terms $(B+I)$ or $(1-R)$ and a parameter C or ZA and is a specific object of this invention to provide a variable electrical network for setting a magnitude corresponding to this product. The equation for $Q_e$ may be written $$2 \log Q_e - \log 12 - \log S - \log M + \log K = 0 \qquad (6)$$

The determination of $Q_e$ thus involves the solving of log Equation 5 which, in turn, involves solving the linear Equation 4 for K.

The calculation of lot size from Equations 4 and 5 even for one item is a tedious and time-consuming task. Where hundreds or thousands of items may be involved this task becomes impossible and it is a specific object of this invention to provide apparatus with which calculations such as that involving Equations 4 and 5 may be readily made.

In accordance with this invention, a computer is provided which includes a plurality of variable electrical components, each component corresponding to a term of the log Equation 6 and each component having a range of variation corresponding to the parameter which it represents; in addition, a second plurality of variable components are provided, each corresponding to a term of the equation defining K. In addition, the apparatus includes a meter and a selector switch having two positions. In one position of the selector switch, the impedances representing the log components are connected in a network with the meter; in the other position, the impedances representing the terms of the equation for K are connected in a network with the meter. Each of the variable components has a scale. The scale for the components representing the log terms is logarithmic. The other scales are linear. A potential which in volts is equal to the parameter represented by the component is impressed across each component.

In using the apparatus, the selector switch is first moved to the position in which the meter is connected to the linear components. The potential across each linear component is then set so that the number of volts is equal to the magnitudes B, I, C, Z, A and R, respectively, and the variable components corresponding to K is varied until the meter reads zero. The switch is then moved to the other position and the potentials across the variable components representing the log terms are now set to correspond to log K, log M and log S and the potential across the component representing log $Q_e$ is varied until the meter reads zero. Thus the magnitude of log $Q_e$ is derived.

In accordance with a specific aspect of this invention, a variable electrical network is provided for apparatus of the above described type for setting a magnitude corresponding to a product such as $(B+I)C$ or $ZA(1-R)$ consisting of the sum of a plurality of terms multiplied by a parameter (or another sum). This network includes a variable transformer on which the single factor C or ZA of the product may be set. The variable transformer supplies a plurality of variable resistors on each of which the terms of the other factor of the product may be set. Where each factor includes a sum of terms a plurality of variable transformers in series may supply a plurality of variable resistors.

A still further feature of the invention involves the calculations of return-on-added-investment. In calculating return-on-added-investment, the problem is usually to compare the return on an investment of one type with the return-on-investment of another type. Mathematically, this problem may be defined by the equation:

$$P1+(I1-L1)CR1+L1i=P2+(I2-L2)CR2+L2i \quad (7)$$

This equation presents the two alternatives herein called alternative I and alternative II to which the numbers 1 and 2 after the letters correspond. In this equation:

$P1$=the annual cost of operating equipment of alternative I to produce a product.
$P2$=the annual cost for alternative II.
$I1$=initial investment in the equipment of alternative I.
$I2$=initial investment for alternative II.
$L1$=the salvage value of the equipment under alternative I.
$L2$=the salvage value of the equipment under alternative II.
$i$=rate of return-on-investment in percent.
$CR1$=Capital recovery factor for alternative I. This capital recovery factor is a function of $i$ and the number of units of time, $n$, anticipated for the equipment.
$CR2$=Capital recovery factor for alternative II.

The time unit is equal to the period during which the capital investment is compounded. The unit may be a year or six months or even less. If the compounding takes place annually $n$ is in years. If the compounding takes place at shorter intervals than years, $n$ would be higher than for years. Thus, if the compounding takes place at intervals of six months and the life of the equipment is 10 years, $n$ would be 20 rather than 10. In the following discussion it will be assumed that $n$ is in years.

It is of interest to derive the equation for CR1 or CR2 so that its significance will be understood. CR1 and CR2 are, in fact, equal to a factor such that I1CR1 (or I2CR2) is the annual payment which would pay for an item of equipment having an initial cost I1 or I2 and having a life of $n$ years, assuming that the return-on-added-investment is $i$.

It is assumed that the investment I in the equipment is made at the beginning of a year and that the amount CRI is realized or paid at the end of each year of the life of the equipment. Let D equal the amount realized or paid at the end of each year. The problem resolves itself into finding D, assuming that it is equal for all years and that at the end of $n$ years the equipment has paid for itself. For the first year the gain in I is I$i$ and the value of the initial investment is $I(1+i)$. At the end of the first year D is subtracted from this so that the investment becomes $I(1+i)-D$. At the end of the second year, the corresponding value is $$I(1+i)^2-D(1+i)$$

At the end of the third year, it is $$I(1+i)^3-D(1+i)^2-D(1+i)$$

At the end of the nth year, then the quantity is $$I(1+i)^n-D[(1+i)^{n-1}+(1+i)^n \ldots 1]$$

and $$I(1+i)^n-D[(1+i)^{n-1}+(1+i)^n \ldots 1]=0$$

Applying the equation for the sum of a geometric progression this becomes $$I(1+i)^n-D\frac{(1+i)^n-1}{i}=0$$

or $$D=I\frac{i(1+i)^n}{(1+i)^n-1}$$

Then $$CR=\frac{i(1+i)^n}{(1+i)^n-1} \quad (8)$$

CR1 and CR2 in the above Equation 7 are then an intricate function of $i$ and $n$ and it is not readily feasible to transform the Equation 7 so that it is expressed as a function of $i$ alone and $n$ alone.

It is then a further object of this invention to provide apparatus for readily determining the magnitude $i$ or any of the other parameters of an equation similar to the above Equation 7 in which one of the parameters appears as a simple function and also as an intricate function so that the equation may not be readily transformed into an equation in the one parameter alone.

This aspect of the invention arises from the realization that sound approximation may be made by initially disregarding certain of the terms of the equation which include either the parameter alone or the intricate function of the parameter. Consideration of the above Equation 7 reveals that the parameters L1 and L2 the salvage value are usually substantially smaller than I1 and I2. In accordance with this invention then apparatus is provided which permits an initial approximate determination of the rate-of-return-on-added-investment $i$ by initially eliminating the salvage value terms, that is L1$i$ and L2$i$, from the equation. Equation 7 then becomes $$P1+(I1-L1)CR1=P2+(I2-L2)CR2 \quad (9)$$

In this equation 9, CR1 and CR2 are different only because the number of years $n$ are different. But it may be assumed that these are alike to a first approximation so that with I1, L1, I2, L2, P1, P2 known, the magnitude of CR may be derived from the Equation 9 which may be expressed as a known function of $i$ and $n$. Since CR is expressed as a known function of $i$ and $n$ it may be calculated directly for a reasonable succession of values of $i$ and $n$ or it may be found in tables for different values of $i$ and $n$. Thus the approximate value of CR, $i$ and $n$ may be derived from Equation 9 for any values of parameters or conversely knowing $i$ and $n$, CR may be known any any of the parameters P1, P2, L1, L2, I1, I2 may be determined if the others are known. Starting with these approximate values more accurate values may be determined.

In accordance with this invention, apparatus is provided which includes a plurality of variable electrical components each corresponding to a term of the above Equation 7. The components corresponding to P1, P2, I1, I2, L1, L2 are preferably variable resistors. The components which correspond to $i$ and CR1 and CR2 are variable transformers properly connected to the resistors. The apparatus also includes a selector switch and a meter. The meter is connected in series with the components. The switch is connected to the variable transformers corresponding to CR1 and CR2 and has two positions. In one of the positions of the switch the components corresponding to I1, L1, I2, L2 are connected to one of the variable transformers corresponding to CR1 or CR2 so that, in effect, CR1 and CR2 are equal, that is, are set for equal $n$. In the other position of the switch, the variable transformer corresponding to CR1 is connected to the components corresponding to I1 and L1 and the transformer corresponding to CR2 to those corresponding to I2 and L2.

In the practice of this aspect of the invention, the apparatus is initially set in the first position, the transformer corresponding to $i$ is set to zero volts, and an approximate magnitude of CR, assuming equal $n$, is determined. The apparatus is then connected so as to represent all of the terms and factors of Equation 7 and starting with the magnitude of $i$ which was derived by the first approximation a more precise magnitude of $i$ is derived.

In dealing with the factor CR in Equation 7 it is necessary that a variable electrical component, specifically a variable transformer, which can readily be set by an operator over a wide range of return-on-added-investment and for different years is provided and it is a specific object of this invention to provide such a component.

In accordance with this aspect of applicant's invention a variable electrical component having separate scales for years and return-on-added-investment is provided. These scales are so correlated that for each setting of the component the value of $i$ for a series of values of $n$ satisfying Equation 8 may be determined.

The novel features considered characteristic of this invention are disclosed generally above. The invention itself both as to its organization and as to its method of operation, together with additional objects and advantages thereof, will be understood from the following description of specific embodiments when taken in connection with the accompanying drawings, in which.

Figures 1, 3, 4:
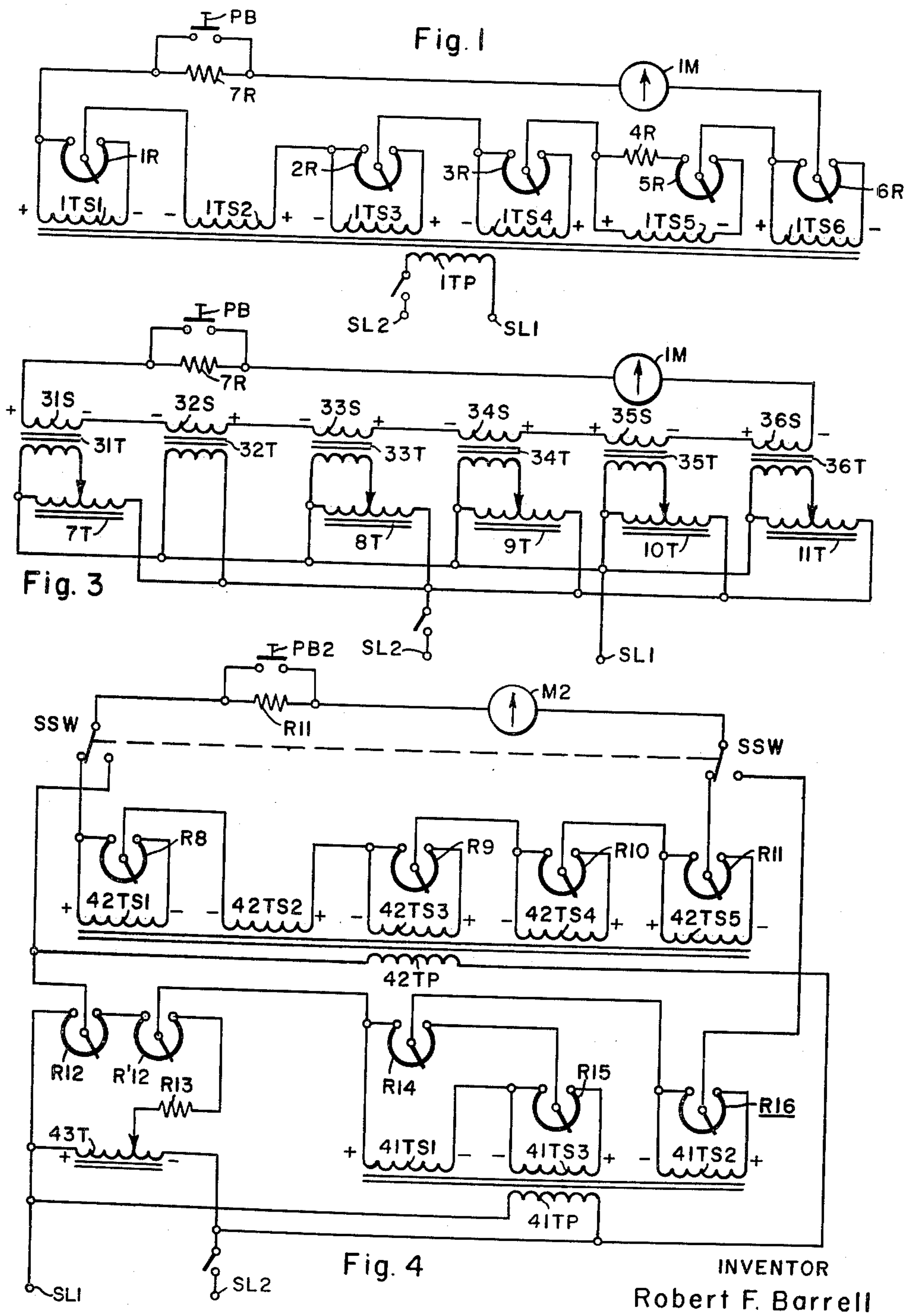
FIGURE 1 is a circuit diagram of an embodiment of this invention for calculating economic lot size.
FIG. 3 is a circuit diagram of a modification of this invention shown in FIGS. 1 and 2.
FIG. 4 is a circuit diagram of a further modification of this invention for calculating lot size more accurately and conveniently than with the apparatus shown in FIGS. 1, 2 and 3.
Figure 2:
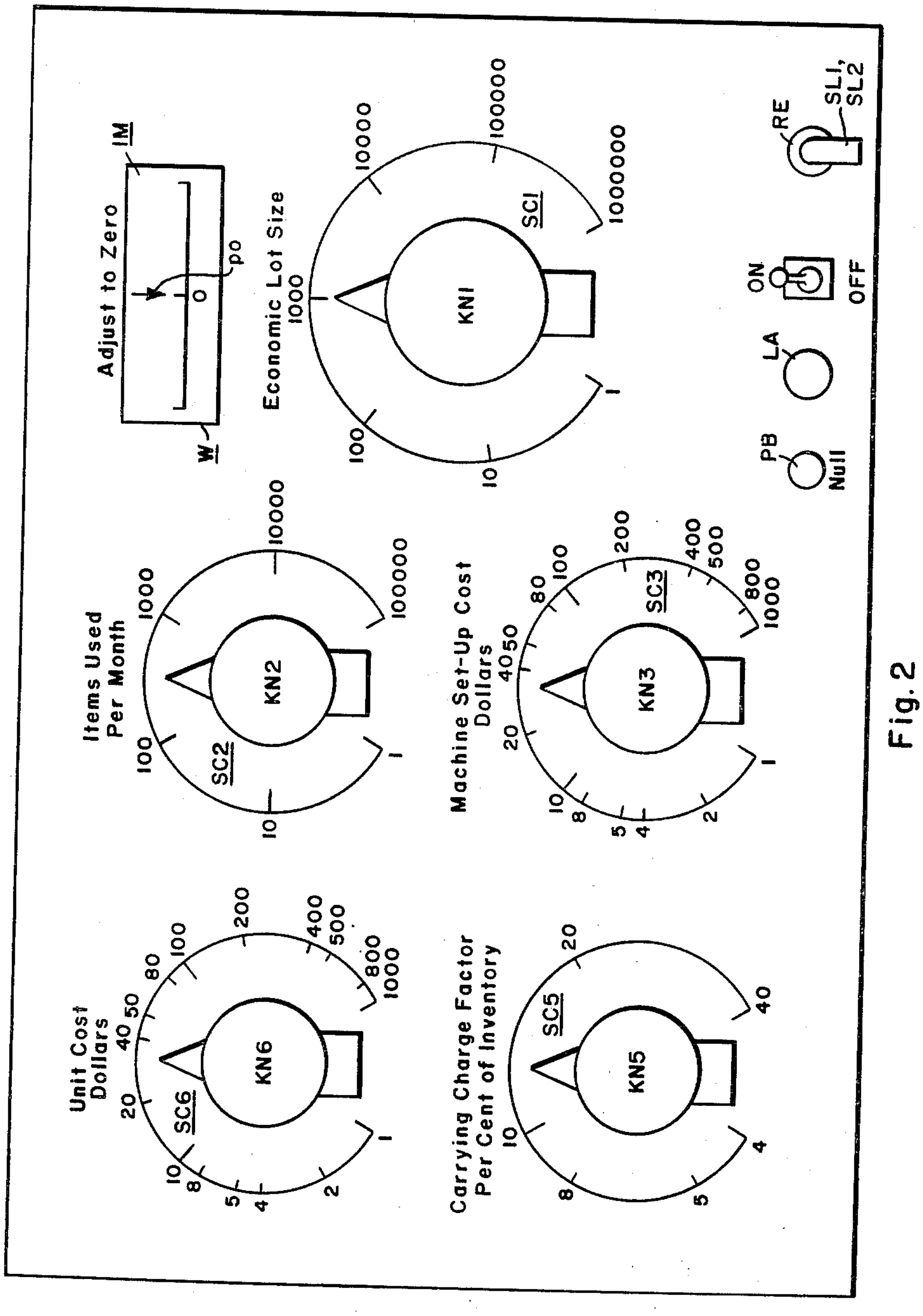
FIG. 2 is a diagrammatic view showing the panel of the apparatus shown in FIG. 1.

The computer shown in FIGS. 1 and 2 is supplied from a pair of conductors SL1 and SL2 which may be connected to the buses of a single-phase alternating-current commercial supply. The conductors SL1 and SL2 supply the primary 1TP of a transformer 1T which has a plurality of secondaries 1TS1, 1TS2, 1TS3, 1TS4, 1TS5 and 1TS6 corresponding in number to the number of terms in the log Equation 3 for L. Secondary 1TS1 corresponds to 2 log L in the equation, secondary 1TS2 to log 24, secondary 1TS3 to log $m$, secondary 1TS4 to log $s$, secondary 1TS5 to log F, secondary 1TS6 to log C. Across each of the secondaries 1TS1, 1TS3, 1TS4 and 1TS6, a variable resistor 1R, 2R, 3R and 6R are connected. Across secondary 1TS5, a variable resistor 5R having in series a fixed resistor 4R is connected. The number of turns of each of the secondaries of 1TS1 through 1TS6 is so related to the number of turns of primary 1TP that the potential across each secondary expressed in volts corresponds to the range of variation of the log of the parameter to which the secondary corresponds. Each of the resistances 1R, 2R, 3R, 4R, 5R and 6R also has a magnitude corresponding to the range of the log of the parameter to which it corresponds.

The apparatus also includes a meter 1M particularly suitable for null setting. A sensitivity resistor 7R is associated with this meter. For sensitive operations, the resistor 7R may be short-circuited by a push button PB. The resistors 1R through 6R and the secondary 1TS2 are connected in a network in series with the meter 1M and the resistor 7R. Each of the resistance components is poled in the network correspondingly to the sign of the term in the log equation to which it corresponds. The polarity at any instant is shown in FIG. 1. Thus assuming that the polarity across resistor 1R is at this instant positive at the left-hand terminal and negative at the right-hand terminal, the secondary 1TS2 will be at this instant negative at the left-hand terminal and positive at the right-hand terminal, the resistor 2R negative at the left-hand terminal and positive at the right-hand terminal, the resistor 3R negative at the left-hand terminal, and positive at the right-hand terminal and resistors 4R—5R positive at the left-hand terminal and negative at the right-hand terminal and the resistor 6R positive at the left-hand terminal and negative at the right. It is seen that each of the above described polarities corresponds to the polarity of the log terms in the equation.

The following Table I is a concise presentation of the important features of apparatus as disclosed in FIGS. 1 and 2 and of the potentials of the secondaries of typical apparatus which has been constructed and found to operate satisfactorily.

*Table I*

| Term | Secondary | Potential, v. | Parameter | Range of Variation |
|---|---|---|---|---|
| 2 Log L | 1TS1 | 230 | Economic lot size. | 0 to 1,000,000. |
| Log 24 | 1TS2 | 26.45 | | |
| Log $m$ | 1TS3 | 57.5 | Items used per month. | 0 to 100,000. |
| Log $s$ | 1TS4 | 95.8 | Machine set-up cost. | 0 to $1,000. |
| Log F | 1TS5 | 10 | Carrying charge. | 5 to 30%. |
| Log C | 1TS6 | 57.5 | Unit cost per item. | 0 to $1,000. |

The apparatus shown in FIG. 1 is mounted in a cabinet which may be generally rectangular and may have a panel as shown in FIG. 2. The knobs KN1, KN2, KN3, KN5 and KN6 of the variable resistors 1R, 2R, 3R, 5R and 6R project through the panel. Each of the knobs KN1 through KN6 is provided with a pointer which is movable over a scale SC1, SC2, SC3, SC5 and SC6 corresponding to the argument of the term set by the associated resistor. The scales are of logarithmic form and each is calibrated in terms of the argument; that is scales SC1 and SC2 in items, scales SC3 and SC6 in dollars and scale SC5 in percent. The panel is provided with a window W through which the pointer P0 of the meter 1M may be seen. The push button PB and the handle of an on-off switch SW also project to the top. In addition, there is a pilot lamp LA which shows that the apparatus is energized and a receptacle RE for connecting a power cable.

In the use of the apparatus, the conductors SL1 and SL2 are energized and the knobs KN2, KN3, KN5 and KN6 are set to correspond respectively to the number of items used per month, the machine setup cost, the carrying charge factor, and the unit cost. The knob KN1 is then moved until the meter 1M reads zero. Thereafter, the sensitivity push button PB is closed and further adjustment of resistor 1R with KN1 takes place until the meter again reads zero. The economic lot size can then be read from the scale SC1 of resistor 1R.

In the apparatus shown in FIG. 3, the settings are produced on variable transformers rather than variable resistors. This apparatus includes the variable transformers 7T, 8T, 9T, 10T and 11T corresponding to the terms of the equation, 2 log L, log $m$, log $s$, log F, log C, respectively. The transformers 7T and 8T through 11T are of the autotransformer type (and may be Variac transformers). The secondary potential is derivable between one of the terminals of each transformer and the adjustable arm. The secondary of each of the variable transformers supplies the primary of an associated transformer 31T, 33T, 34T, 35T and 36T, respectively. The secondaries 31S, 33S, 34S, 35S and 36S of the latter transformers and secondary 32S of a transformer 32 corresponding to the term log 24 are connected in a network with a meter 1M and the resistor 7R similar to the network in which the resistors are connected in the FIG. 1 embodiment. The mounting provisions for the apparatus shown in FIG. 3 and its use is similar to that for the apparatus shown in FIGS. 1 and 2.

With the apparatus shown in FIG. 4, Equation 6

$$2 \log O_e - \log 12 - \log s - \log m + \log K = 0$$

and Equation 4

$$K = \frac{(B+I)C + ZA(1-R)}{2}$$

are solved. This apparatus includes a Log Unit and a K Unit which may be selectively set to operate in networks with a common meter M2 by selector switch SSW. The apparatus is supplied from conductors SL1 and SL2.

The Log Unit includes a transformer 42T having a primary 42TP supplied from conductors SL1 and SL2 and a plurality of secondaries 42TS1, 42TS2, 42TS3, 42TS4 and 42TS5. Each of these secondaries corresponds to a term of the log equation; 42TS1 to 2 log $Q_e$, 42TS2 to log 12, 42TS3 to log $S$, 42TS4 to log $M$ and 42TS5 to log $K$. The secondaries 42TS1, 42TS3, 42TS4 and 42TS5 are shunted by variable resistors R8 through R11. In one position of the switch SSW these resistors and the secondary 42TS2 are connected in a network with the meter M2 and its sensitivity resistor R11, the resistors R8 through R11 being poled correspondingly to the sign of the logs of the corresponding parameters in Equation 6. The K Unit includes transformer 41T and variable transformer 43T. The transformer 41 has a primary 41TP connected across conductors SL1 and SL2 and a plurality of secondaries 41TS1, 41TS2 and 41TS3. Across the secondary 41TS3, a variable resistor R15 is connected. A variable resistor R14 is connected between the adjusting arm R15 and one terminal of 41TS1. The resistor R15 corresponds to R and a potential equal to 1 is derivable from 41TS1. The resistor R14 then corresponds to ZA (1−R). Across the secondary 41TS2 a variable resistor R16 which corresponds to K is connected.

The secondary of transformer 43T corresponds to the factor C of the term $(B+I)$ $C$ of the equation for K. Between one of the terminals and the adjustable arm of the transformer 43T, a fixed resistor R13 in series with variable resistors R12 and R'12 are connected. The resistors R12 and R'12 correspond to the terms B and I of the term $(B+I)$ $C$.

The resistors R12 through R16 are connected in a network with the meter M2 in the other position of the switch SSW. In this network the resistors are so poled and so set that as to correspond to the terms of Equation 4

$$K - \frac{(B+I)C + ZA(1-R)}{2} = 0$$

Like the apparatus of FIGS. 1, 2 and 3 the apparatus of FIG. 4 is mounted in a cabinet (not shown) with a panel top. The panel carries scales and knobs for the resistors R8 through R12 and R14 through R16 and for 43T. The scales for resistors R8 through R11 are logarithmic and the scales of the resistors R12, R14, R15 and R16 and of 43T are linear. The potential of the secondaries 42TS1 through 42TS5 correspond to the range of magnitudes of the terms of the Log equation. The potentials of the secondaries of the other transformers 41T, 43T correspond to ranges of the term of the equation for K.

The data for the former is presented in Table II.

*Table II*

| Term | Secondary | Potential, v. | Parameter | Range of Variation |
|---|---|---|---|---|
| 2 Log $Q_e$ | 42TS1 | 230 | Lot size | 0 to 1,000,000 items. |
| Log 12 | 42TS2 | 12.4 | | |
| Log S | 42TS3 | 57.5 | Cost of setting up machines and the like. | 0 to $1,000. |
| Log M | 42TS4 | 95.8 | Items used per month. | 0 to 100,000 items. |
| Log K | 42TS5 | 57.5 | Given by equations for K. | 0 to $1,000. |

Table III presents similar data for the equation for K.

*Table III*

| Term or Factor | Secondary | Potential, v. | Parameter | Range of Variation |
|---|---|---|---|---|
| C | 43T | 115 | Unit cost of item. | 0 to $1,000. |
| B+I | 43T, R12 and R'12. | 57.5 | Taxes, insurance and the like and desired rate on capital. | 0 to 50%. |
| A | 41TS1 and part of R12. | 115 | Cost of storing each item. | 0 to $500. |
| 1-R | 41TS1 and 41TS3. | 115 | Ratio of M to P. | 0 to 1/10. |
| K | 41TS2 | 172.5 | K factor | 0 to $750. |

In the use of this apparatus, the selector switch SSW is first set so that the resistors R12, R14 and R16 are connected in a circuit with the meter M2. The resistors R12, R14 and R15 are then set to correspond to the various parameters. Thereafter, R16 is adjusted until M2 reads zero. The sensitivity push button PB2 is then closed to shunt out resistor R11 and resistor R16 is reset.

The switch SSW is then set in the other position. Resistors R9 and R10 are set to correspond to the terms log S and log M of the log equation and resistor R11 to correspond to the log of the setting on resistor R16. Resistor R8 is then adjusted until the meter M2 reads zero. Thereafter the push button PB2 is closed and the resistor R8 reset. The setting of resistor R8 gives the desired economical lot size.

The apparatus shown in FIGS. 5 through 8 is used in the solving of the Equation 7 for return-on-added-investment. This equation is $$L1i + P1 + (I1 - L1)CR1 = L2i + P2 + (I2 - L2)CR2$$

and may be written $$L1i + P1 + (I1 - L1)CR1 - L2i - P2 - (I2 - L2)CR2 = 0 \quad (10)$$

The apparatus shown in FIGS. 5 through 8 is supplied from conductors SL1 and SL2 and includes a plurality of transformers 101T, 102T, 103T and 104T. In addition, this apparatus includes a plurality of variable transformers 1VAR, 2VAR, 3VAR and a selector switch SSW1. The primary 102TP of transformer 102T is connected between conductors SL1 and SL2. The primaries of transformers 1VAR, 2VAR, and 3VAR are also connected between conductors SL1 and SL2. The primary 104TP of transformer 104T is connected between the adjustable tap of 3VAR and one of its end taps.

The switch SSW1 has two positions. In one position, the primaries 103TP and 101TP are both connected between the adjustable arm and one terminal of transformer 1VAR. In the other position of the switch SSW1, the primary 103TP is connected between the adjustable arm of 2VAR and one of its terminals and the primary 101TP is similarly connected to transformer 1VAR. The primary 101TP is in this circuit shunted by a resistor 100R.

The transformer 1VAR corresponds to the factor CR1 in Equation 10. The transformer 101T has a pair of secondaries 101TS1 and 101TS2, one of which corresponds to I1 and the other to L1. The transformer 2VAR corresponds to the factor CR2, the transformer 103T has a pair of secondaries 103TS1 and 103TS2 which correspond respectively to L2 and I2. The variable transformer 3VAR corresponds to the factor $i$ and the transformer 104T which is supplied from this variable transformer includes a pair of secondaries 104TS1 and 104TS2 which corresponds to the terms L1$i$ and L2$i$, respectively. The transformer 102T has a pair of secondaries 102TS1 and 102TS2 which corresponds respectively to the terms P1 and P2.

The apparatus shown in FIGS. 5 through 8 also includes a plurality of potentiometers 1P, 2P, 3P, 4P, 5P, 6P, 7P and 8P. These potentiometers 1P through 8P are of the type including a plurality of resistors RZ of equal resistance and a tap switch TS for determining the number of resistors to be connected between one of the terminals of the potentiometers and the switch. The apparatus also includes a plurality of potentiometers 1P′, 2P′, 3P′, 4P′, 5P′, 6P′, 7P′, and 8P′. The latter are of the continuously variable type and have a maximum resistance approximately equal to each of the resistors of the potentiometers 1P through 8P. Thus, a potentiometer 1P′ through 8P′ may be used to provide a precise or vernier adjustment between two settings of a potentiometer 1P through 8P, respectively.

The potentiometers 1P and 1P′ are connected in series with a resistor 109R across secondary 104TS1. Potentiometers 2P and 2P′ are similarly connected in series with resistor 105R across secondary 102TS1. 3P and 3P′ are similarly connected to 101TS1, 4P and 4P′ to 101TS2, 5P and 5P′ to 103TS1, 6P and 6P′ to 103TS2, 7P and 7P′ across 102TS2, and 8P and 8P′ across 104TS2, the potentiometers 1P and 4P and 1P′ and 4P′, respectively, and the potentiometers 5P and 8P and 5P′ and 8P′, respectively, are ganged.

The following Table IV shows the factors of Equation 10 which are set by the various components:

*Table IV*

| Term | Factor | Symbol | Component |
|---|---|---|---|
| L1$i$ | Salvage Value, Alt. I | L1 | 1P and 1P′ |
| L1$i$ | Rate-of-Return | $i$ | 3VAR. |
| (I1-L1) CR1 | Salvage Value, Alt. I | L1 | 4P and 4P′. |
| (I1-L1) CR1 | Initial Investment, Alt. I | I1 | 3P and 3P′. |
| (I1-L1) CR1 | Capital Recovery Factor—Alt. I. | CR1 | 1VAR. |
| P1 | Annual Cost of Operating Equipment. | P1 | 2P and 2P′. |
| L2$i$ | Salvage Value, Alt. II | L2 | 5P and 5P′. |
| (I2-L2) CR2 | Salvage Value, Alt. II | L2 | 8P and 8P′. |
| (I2-L2) CR2 | Initial Investment, Alt. II | I2 | 6P and 6P′. |
| (I2-L2) CR2 | Capital Recovery Factor—Alt. II. | CR2 | 2VAR. |
| P2 | Annual Cost of Operating Equipment—Alt. II. | P2 | 7P and 7P′. |

In one position of switch SSW1 the potential across 3P and 3P′ and 4P and 4P′ is determined by 1VAR which corresponds to CR1 and the potential across 5P and 5P′ and 6P and 6P′ by 2VAR which corresponds to CR2. In the other position 103TP and 101TP are both energized from 1VAR, that is CR1 and CR2 are equal.

The apparatus includes a meter M13 having a resistor 101R which may be shunted out by a push button PB3 to increase sensitivity. The potentiometers 1P through 8P and 1P′ through 8P′ are connected in series with meter M13 and resistor 101R with the potentials across the potentiometers so poled that the potential across each potentiometer corresponds to the sign of the corresponding term in the Equation 10.

Figure 5:
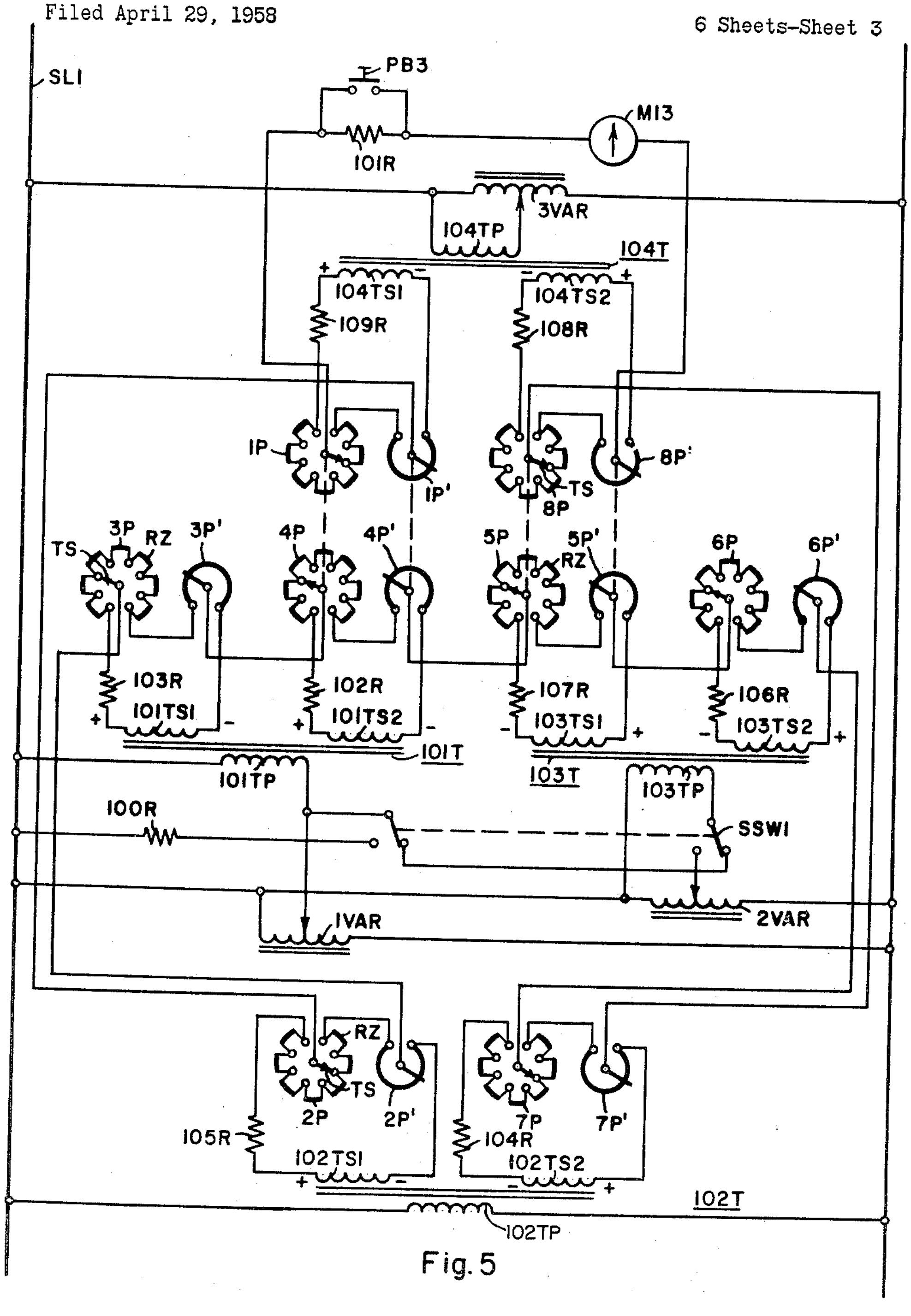
FIG. 5 is a circuit diagram of an embodiment of this invention for calculating rate-of-return-on-added-investment.
Figure 6:
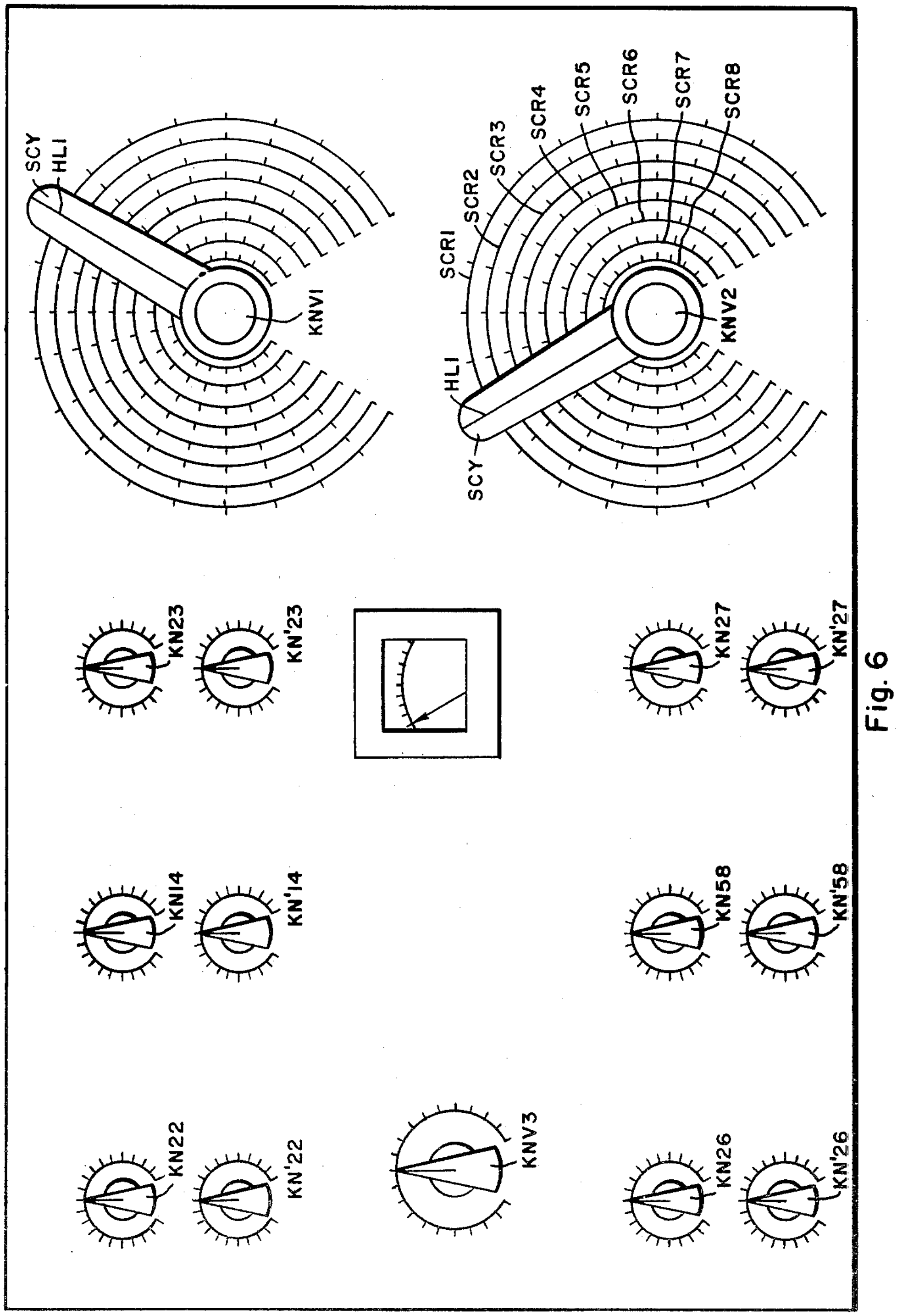
FIG. 6 is a diagrammatic view of the panel for the apparatus shown in FIG. 5.

In the practice of this invention, the apparatus shown in FIG. 5 are mounted in a cabinet, the top panel of which is shown in FIG. 6. Each of the potentiometers 2P, 3P, 6P and 7P have knobs KN22, KN23, KN26, and KN27. The corresponding potentiometers 2P′, 3P′, 6P′ and 7P′ have knobs KN′22, KN′23, KN′26, KN′27. The potentiometers 1P and 4P, 1P′ and 4P′, 8P and 5P, 8P′ and 5P′ have common knobs KN14, KN′14, KN58, KN′58. A graduated scale is associated with each of the knobs. The scales of the potentiometers 1P through 8P are each graduated in dollars from 0 to $10,000. The scales of the potentiometers 1P′ through 8P′ are each graduated from 0 to 500 to correspond to one graduation of the corresponding scales 1P through 8P, respectively.

Figure 7:
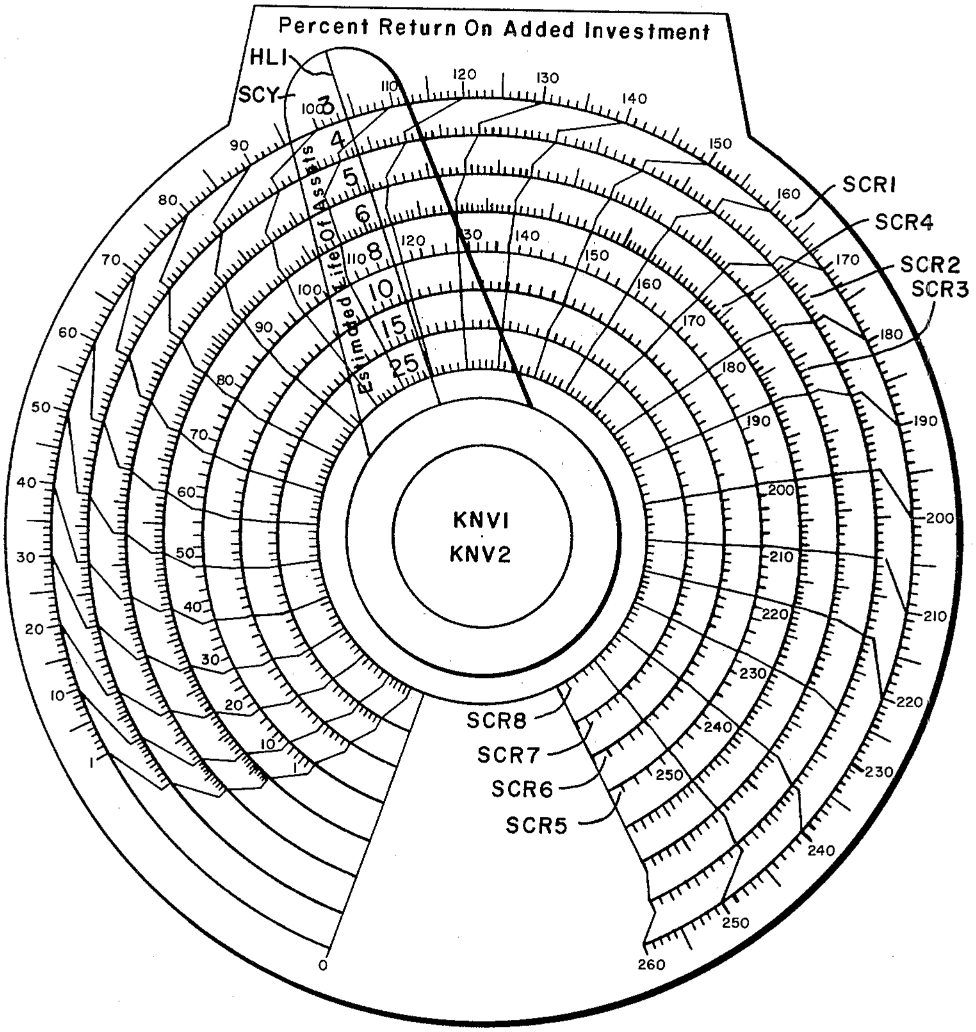
FIG. 7 is a view in front elevation of a dial used in the apparatus shown in FIGS. 5 and 6.

The variable transformers 1VAR, 2VAR and 3VAR each has a knob KNV1, KNV2, KNV3, respectively, which extends through the top panel. Variable transformer 3VAR which is set to correspond to the rate of return $i$ is provided with a scale graduated in percent rate of return. Transformers 1VAR and 2VAR are each provided with a plurality of scales SCR1 through SCR8 and a scale SCY shown in more complete detail in FIG. 7. The scale SCY is inscribed on a transparent strip carried by the knobs KNV1 and KNV2. The graduations of this scale SCY are in years, $n$, and extend from the end of the strip to the knob (KNV1, KNV2) in years. For convenience, the years 3, 4, 5, 6, 8, 10, 15 and 25 are selected. The strip also carries a hairline HL1 centrally. The scales SCR1 through SCR8, respectively, are of circular form spaced to correspond to the time interval scale and extend around the knob. Each of these latter scales are graduated in percent return-on-added-investment; that is in $i$. The graduation is such that each graduation, $i$, on a circular scale and the corresponding number of years, $n$, on the scale extending from the knob corresponding to a magnitude of CR in which $i$ is the selected point on the circular scale and $n$ is the number of years on the scale attached to the knob. For example, as shown in FIG. 7, the knob is set at the marking 104 of the outer circular scale which corresponds to $n=3$. Thus the setting corresponds to a return-on-added-investment of 104% and a life of equipment of three years. The value of CR to which these values of $i$ and $n$ correspond is given by the equation:

$$CR=\frac{i(1+i)^n}{(1+i)^n-1}$$

$$=\frac{1.04(1+1.04)^3}{(1+1.04)^3-1}$$

$$=\frac{(1.04)(2.04)^3}{(2.04)3-1} \quad \text{or} \quad CR=1.18$$

Figure 8:
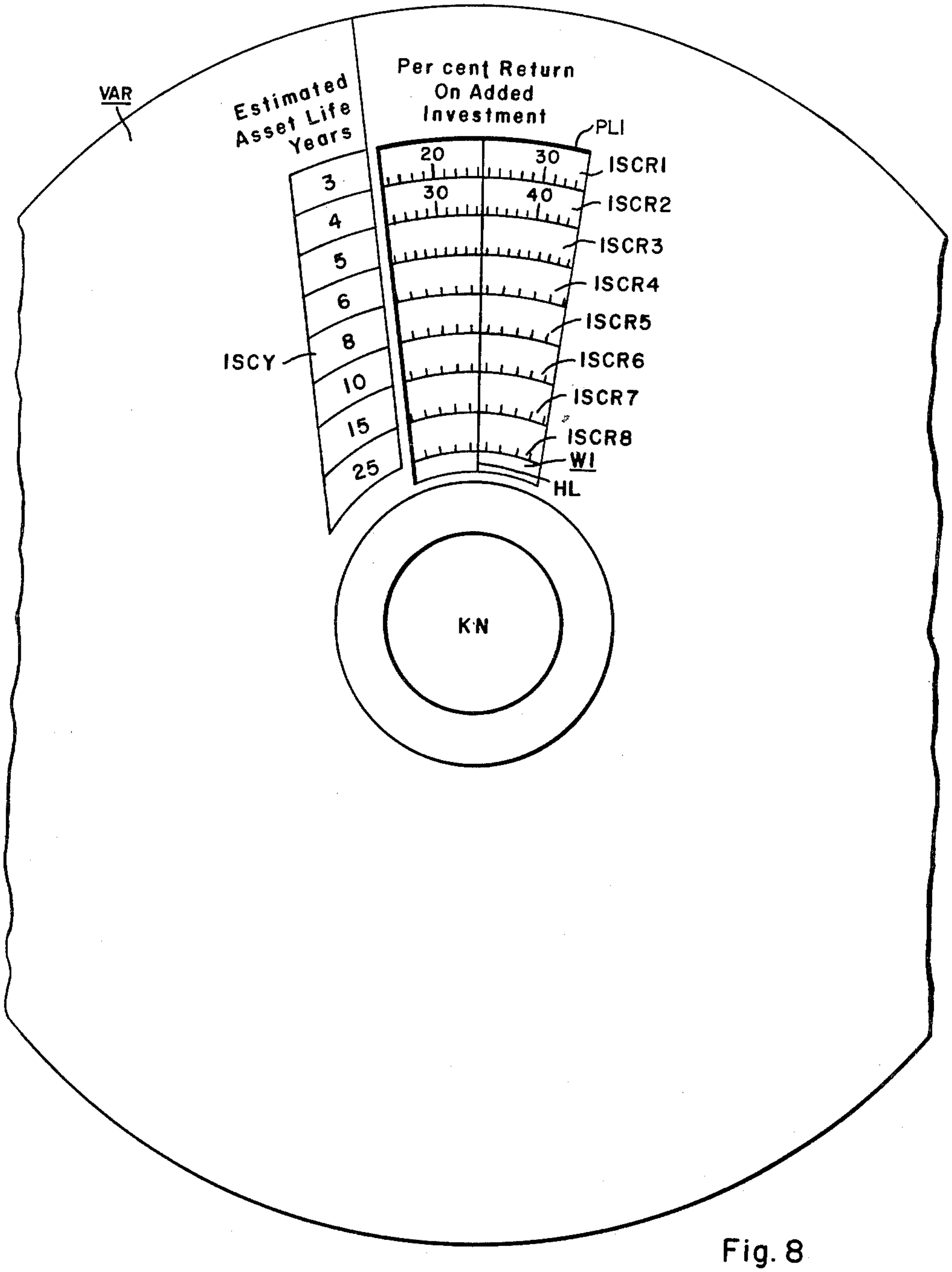
FIG. 8 is a view in front elevation of a modification of the dial shown in FIG. 7.

In place of the apparatus shown in FIG. 7 the apparatus shown in FIG. 8 may be used. In this case the variable transformer VAR is provided with an outer plate PL1 having a window W1 and the knob KN carries a plurality of circular scales 1SCR1 through 1SCR8 which are movable past a hairline HL along the window W1. The $n$ scale 1SCY extends along the window W1 from the rim of the outer plate of the variable transformer to the knob KN. The rates of return corresponding to each $n$ on scale 1SCY appear on the adjacent circular scales 1SCR1 to 1SCR8.

At this point, it appears derivable to consider the accuracy of the computer shown in FIGS. 5, 6, 7 and 8. The accuracy is limited only by the preciseness of the components and the accuracy in making the dial calibrations. The most significant contribution to accuracy in the computer is the degree of linearity, total-resistance tolerance, and resolution of potentiometers 1P through 8P and 1P′ through 8P′. Linearity is the degree with which the increment of resistance is duplicated throughout the entire range of mechanical rotation. The total-resistance tolerance is the closeness with which the actual potentiometer resistance matches the nominal rating. The resolution is the measure of the smallest increment of resistance change possible. On wire-wound potentiometers the resolution is fixed by the resistance of a single turn of the resistance element.

There are extremely precise potentiometers available for instrumentation application and if these are included in the equipment the potentiometers 1P' through 8P' could be dispensed with, but the cost of potentiometers of this type may be as high as $125.00. As a compromise between cost and preciseness, the potentiometer corresponding to each parameter consists of a tap-switch-precision-resistor assembly (1P through 8P) with a low-resistance vernier (molded-composition type) potentiometer (1P' through 8P') in series. By using a tap-switch-precision-resistor assembly, the calibration of these dials is avoided, since each point on the resistance dial is set by the indexing device on the tap switch. This technique also makes feasible the replacement of components in the event of failure, without requiring recalibration. The tolerance of potentiometers 1P' through 8P' used on computer is ±1%. These components are each used in conjunction with the tap-switch assembly to span the resistance values between points on the tap switch. Thus, placing 3610 ohms on this combination involves setting the tap switch at 3500 and the potentiometer (1P' through 8P') at 110. The two add directly to give 3610.

The dial calibration for 1P' through 8P' was made from the actual resistance-mechanical-displacement curve of the potentiometer. The error introduced by a replacement potentiometer in the event of failure is neglected, since the error would represent a very small percentage of the total circuit resistance.

The computer circuit is symmetrical on both sides of the dividing line between 4P' and 5P. To this extent it is important that the total resistance in 1P through 4P each match the resistance of 5P through 8P.

The preciseness of transformer voltages ranks next to that of the resistances in determining computer accuracy. Specifically the voltage across the different secondaries 104TS1, 102TS1, 101TS1, 101TS2 must match the voltages across secondaries 104TS2, 102TS2, 103TS2, 103TS1 to plus 0.5%.

The accuracy in calibrating and reading the rate-of-return dials is largely determined by the sharpness of the null indication given by the null meter M3. The voltage multiplier resistor 101R must be such that the meter M3 just reads full scale when the dials are set at maximum settings for one alternative and at zero for the other alternative. Under this condition the sum of the transformer voltages in secondaries add directly. In actual practice the dials are rarely set at such extreme settings and the meter voltage is low. To give a sharper null indication at these low voltages a push button PB3 is provided to short out the multiplier resistance 101R. This button is pushed only after a rough null adjustment has been made. The meter voltages preferably used are 175 volts full scale (push button open) and 5 volts full scale (push button closed).

The resolution of the variable transformers 1VAR, 2VAR, 3VAR (rate-of-return-dials) is approximately .5 degree rotation.

The voltages selected for the transformer secondaries 102TS1 and 102TS2 should be low enough to be well within the insulation rating of commercial tap switches. These voltages were fixed at about 42 volts. The voltages of 104TS1, 101TS1, 101TS2, 103TS1, 103TS2 and 104TS2 depend on the maximum rate of return setting of 1VAR, 2VAR, 3VAR. The maximum rate of return on the dials in FIGS. 7 and 8 is 260%. The voltages of 104TS1, 101TS1, 101TS2, 103TS1, 103TS2 and 104STS2 should then be 260% of 42 or 109. This voltage is rounded off to 115 volts.

The total resistance values for 1P through 8P should be selected to some convenient multiple of the full scale dial calibration, since the dials are each calibrated from 0 to $10,000. The resistance selected in one unit of the apparatus to represent this dollar amount is 10,000 ohms. The individual tap switch resistors are, therefore, 10,000/20=500 ohms. The resistance of the vernier potentiometers 1P' through 8P' is 500 ohms. In another unit of the equipment there are only 10 steps of 1000 ohms each and the vernier potentiometers are each 1000 ohms. Low magnitudes of resistance should be avoided to eliminate errors contributed by potentiometer slider and tap-switch rotor contact resistances.

The current through potentiometers 3P, 3P' and 4P, 4P' and 5P, 5P' and 6P, 6P' is proportional to the capital-recovery factor CR1 or CR2 as the case may be. The capital-recovery factor for any return $i$ and term $n$ can be calculated or derived from a table. The dial for 3VAR can be graduated uniformly but the rate-of-return-rate scales of 1VAR and 2VAR must be calibrated so that at each setting the value of $n$ and $i$ satisfies the equation for CR corresponding to the setting.

The calibration may be carried out for the special case in which the switch SSW1 is set so that both 101TP and 103TP are supplied from 1VAR that is $CR1=CR2=CR$. Also it may be assumed that $L1=L2=0$. Then $$CR=\frac{P2-P1}{I1-I2}$$

it may further be assumed that P1 the annual cost of operating for alternative I and I2 the initial investment of alternative II are zero. Then $$CR=\frac{P2}{I1}$$

In accordance with the above assumptions SSW1 is set in the position in which CR1=CR2, and 1P and 1P', 2P and 2P', 4P and 4P', 5P and 5P', 6P and 6P' and 8P and 8P' are set to zero. Now 3P and 3P' and 7P and 7P' may be set successively at a series of magnitudes corresponding to different values of CR and for each setting 1VAR varied so that the meter M3 reads zero. For each value of CR and for each value of $n$ on the time scale, a value of $i$ can be derived from a table, or calculated. The graduation at which 1VAR is set can be labeled with the value of $i$.

For example initially I1 may be set at 1000 and P2 at 2000 given a value of $CR=2$. Having set the corresponding potentiometers, it is then only necessary to adjust the 1VAR dial until a meter null is obtained. This locates the particular rate of recovery, $i$, for each $n$ where $n$ and $i$ are so related that $CR=2$. In the same way other points on the scales may be determined.

In explaining the use of the apparatus shown in FIGS. 6 and 7, let it be assumed that two alternative types of equipment are under consideration and it is desirable to compare the rate-of-return. Let it be assumed that alternative I involves a higher investment I1, a lower annual cost P1, and a salvage value L1 and the life of the equipment is $n1$ giving CR1 dependent on $i$ and $n1$. Let it be assumed that alternative II involves a lower investment I2, a higher annual cost P2, a salvage value L2 and life $n2$ giving CR2. Initially the switch SSW1 is set so that both transformers 101T and 103T are supplied from variable transformer 1VAR. In addition, 3VAR is set at zero or its secondary open circuited so that there is no voltage on transformer 104T. For convenience SSW1 may include a contact to open circuit the connection between 3VAR and 104TP or to set the voltage of 104TP at zero. The zero setting of 104T eliminates the effect of salvage value on rate-of-return. The potentiometers 2P and 2P', 3P and 3P', 4P and 4P', and 5P and 5P', 6P and 6P', and 7P and 7P' are now set to correspond to the given values of P1, I1, L1, and L2, I2 and P2. 1VAR is then set so that the meter M3 reads zero. The rate-of-return $i$ for the number of years assumed for the equipment involving investment I1 may then be determined for the dials of 1VAR. This rate-of-return $i$ may now be used as a first approximation for determining the actual rate of return.

Leaving 1VAR set as it is, 3VAR is set to the rate of return shown on 1VAR and the selector switch SSW1 is moved to the positions in which transformer 101T is supplied from 1VAR and transformer 103T is supplied from 2VAR. 2VAR is then adjusted so that the meter M3 reads zero. This yields a rate of return which may be determined from the scales on 2VAR for the number of years life of the equipment for alternative II. 1VAR, 2VAR and 3VAR may then be adjusted so that a more accurate value of the rate-of-return is ultimately obtained.

While certain specific embodiments of this invention have been disclosed herein, it is understood that many modifications thereof are feasible. This invention then is not to be restricted except insofar as is necessitated by the spirit of the prior art.

I claim as my invention:

1. A computer particularly for computing economic data from an equation expressible as the algebraic sum of a plurality of terms equated to zero, at least one of said terms being the product of at least two factors, one of the factors of said one term being a variable parameter derivable by solving said equation, said computer comprising conductors for supplying an alternating potential, a plurality of transformers each having primary winding means and secondary winding means, at least one of said transformers being of the variable type, each of said secondary winding means corresponding to one of said terms and the secondary winding means of said variable transformer corresponding to said one term, means connecting said primary winding means to said conductors, a variable resistor corresponding to each of said terms, means connecting each of said variable resistors to the corresponding secondary winding means so that the voltage of each secondary winding means is impressed across the corresponding resistor, a meter, and means connecting in a series network said variable resistors and said meter, each of said variable resistors being poled in said network so that its potential has a polarity corresponding to the sign of the corresponding term in said equation, the turns of the primary and secondary winding means of each transformer being so related that the potential of each secondary winding means corresponds to the range of magnitudes of the corresponding terms and the potential of the secondary winding means of said variable transformer corresponds to the range of magnitudes of said one factor, said secondary winding means of said variable transformer and its corresponding variable resistor being so related that said one factor is registerable on said secondary winding means and the other factor on said last-named variable resistor.

2. A computer particularly for computing economic data from an equation expressible as the algebraic sum of a plurality of terms equated to zero, at least one of said terms being the product of the algebraic sum of at least two parameters and a third parameter, the said computer including conductors for supplying an alternating potential, at least one variable transformer means having primary winding means and at least a pair of secondary winding means, said variable transformer means corresponding to said one term, and each of said secondary winding means corresponding to one of said two parameters, means connecting said primary winding means to said conductors, means connected to said conductors for deriving a potential corresponding to each term other than said one term, a variable resistor corresponding to each of said two parameters, and means connecting each of said resistors to be supplied from the corresponding secondary winding means, the number of turns of said secondary winding means being so related to the number of turns of said primary winding means over its range of settings that the potentials of said secondary winding means over the range of settings of said transformer cover the range of variation of said parameters.

3. A computer particularly for computing economic data from an equation expressible as the algebraic sum of a number of terms equated to zero, at least one of said terms including a parameter CR1 which is a function of at least two other parameters $n1$ and $i$ and at least another of said terms including a further parameter CR2 which is a like function of $n2$ and $i$, $n2$ being different than $n1$, the said computer comprising conductors for supplying an alternating potential, a plurality of variable electrical components, each component corresponding to one of said terms, means connecting said conductors to said components to impress potentials thereon, a meter, selective means having a first position and a second position, a first network including said selective means in said first position, said meter and the components corresponding to the terms of said equation including the components corresponding to said one term and said other term so connected as to be capable of introducing potentials of different magnitudes into said network corresponding to said one term and said other terms, and a second network including said selective means in said second position, said meter and the components corresponding to the terms of said equation including the component corresponding to said one term only, said last-named component to be so connected as to be capable of introducing potentials of equal magnitudes into said second network corresponding to said one term and said other term.

4. In combination, in a computer, a first variable transformer, a second variable transformer, a first variable impedance, a second variable impedance, a selective means having a first position and a second position, means including said selective means in said first position connected to said impedances and to said transformers for connecting said first transformer to supply said first impedance and said second transformer to supply said second impedance, and means including said selective means in said second position connected to said impedances and said first transformer for connecting said first transformer to supply both said impedances.

References Cited in the file of this patent

UNITED STATES PATENTS

| | | |
|---|---|---|
| 1,573,850 | Naiman | Feb. 23, 1926 |
| 2,244,369 | Martin | June 3, 1941 |
| 2,540,807 | Berry | Feb. 6, 1951 |
| 2,673,030 | Isserstedt | Mar. 23, 1954 |
| 2,746,417 | McCord et al. | May 22, 1956 |
| 2,805,636 | Smith | Sept. 10, 1957 |
| 2,955,761 | Brown et al. | Oct. 11, 1960 |

OTHER REFERENCES

Electronic Engineering (Mynall), June 1947, pages 178–180.

Trans. of AIEE (Hornfeck), July 1952, pages 183–192.